Feb. 13, 1962 J. L. SCOTT 3,021,009
AUTOMATIC GRAIN SEPARATOR CONTROL
Filed Nov. 16, 1959 2 Sheets-Sheet 1
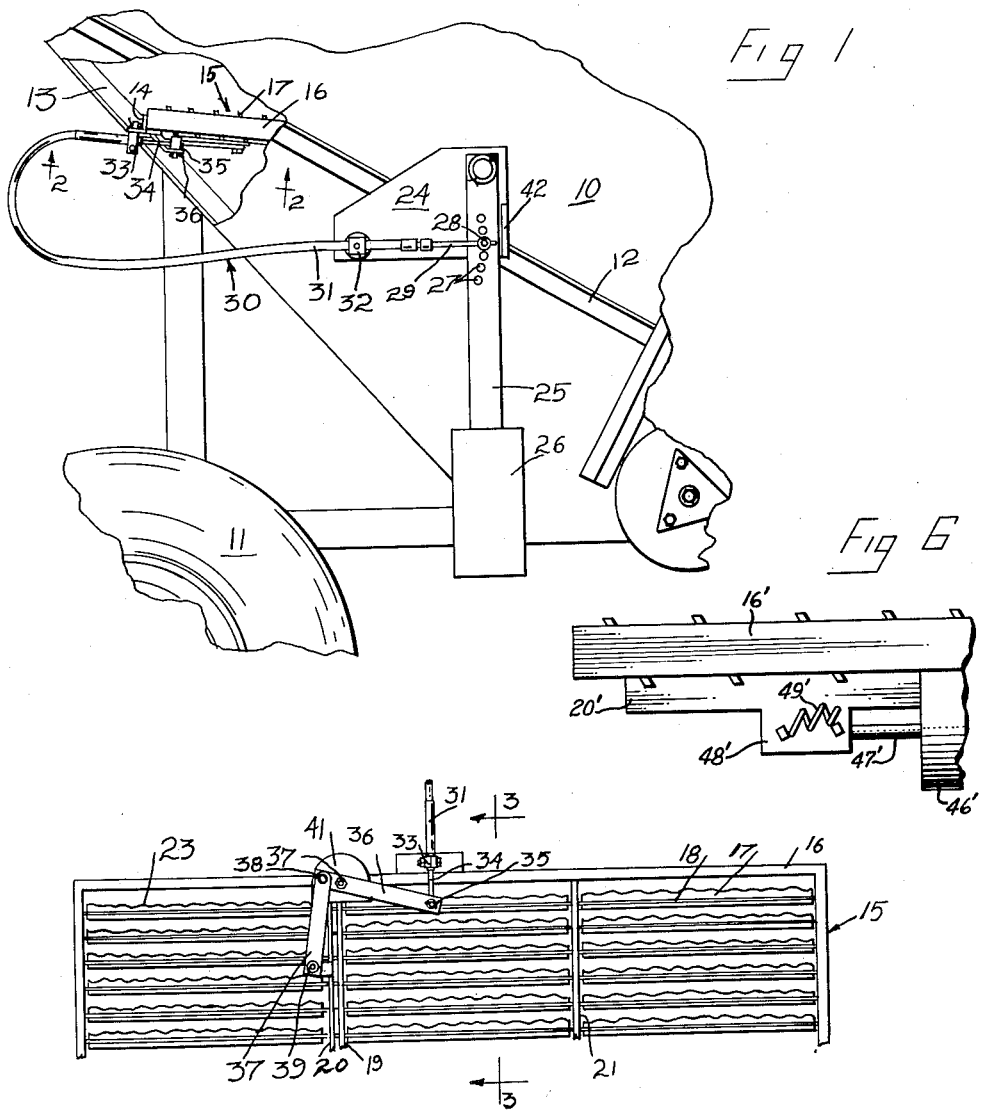
INVENTOR.
Joe L. Scott
BY
atty.

INVENTOR.
Joe L. Scott
BY

3,021,009
AUTOMATIC GRAIN SEPARATOR CONTROL
Joe L. Scott, Rte. 1, Box 46, Lewiston, Idaho
Filed Nov. 16, 1959, Ser. No. 853,413
4 Claims. (Cl. 209—394)

This invention relates to a mechanism which automatically varies the sieve openings of a grain separator to compensate for uphill movement.

One of the final steps in harvesting grain is the passing of the separated grain and chaff through two sieves, which are in constant motion and across which air is blown to remove the chaff. A problem arises when the combine must harvest uphill, since the sieve openings are composed of plates whose position is normally set manually. As the combine tilts rearwardly, grain is sometimes shifted over the rear end of the lower sieve and is returned to the cylinder to be threshed again. This poses serious loss problems and tends to overload the cylinder.

It is an object of this invention to compensate for uphill movement by automatically maintaining the adjustment of sieves with respect to the vertical. This is accomplished by linking the adjustment bar to a pendulum pivoted on the frame of the machine. Such linkage may be mechanical, hydraulic or a combination of the two.

It is a further object of this invention to control the adjustment of the constantly moving sieves by means of a flexible connection to a remote reference control located on the frame of the machine.

These and still further objects will become evident from the following description and drawings which illustrate a preferred form of my invention. It is to be emphasized that this disclosure is exemplary and is not intended to limit the extent of the invention except as it is defined in the claims.

In the drawings:

FIGURE 1 is a fragmentary side view of the rear end of a combine equipped with the invention, part of the side wall being broken away;

FIGURE 2 is a fragmentary bottom view of the sieve taken along line 2—2 in FIGURE 1;

FIGURE 6 is an enlarged fragmentary side view of the connection between the slave cylinder and the adjusting bar shown in FIGURE 5.

Figure 3:
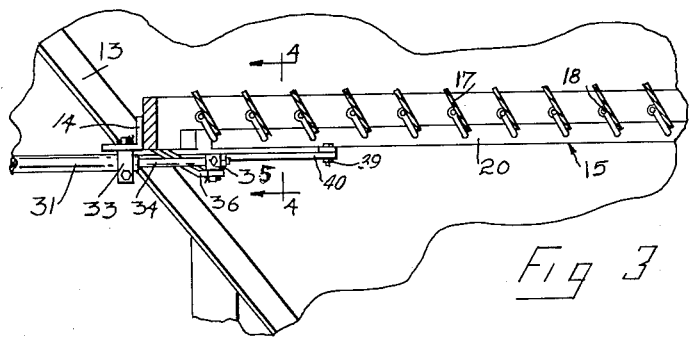
FIGURE 3 is an enlarged fragmentary sectional view taken along line 3—3 in FIGURE 2.
Figure 4:
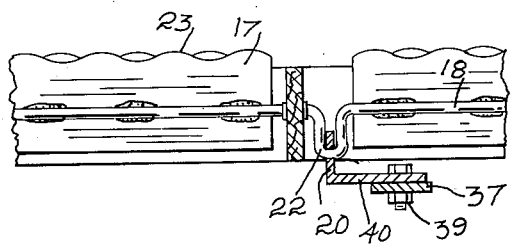
FIGURE 4 is an enlarged sectional view taken along line 4—4 in FIGURE 3.

Referring now to the drawings, and to FIGURE 1 in particular, a combine is shown in partial view, having a side wall 10, rear wheel 11 and a brace 12. The rear frame 13 has a lateral bar 14 extending across the machine. Located inside wall 10 is a bottom sieve 15 which is of normal construction. This is composed of a rectangular frame 16 which pivotally mounts a series of parallel lips 17 upon rods 18 which are fixed to the lips. An intermediate divider 19 supports part of the load of lips 17 and an adjusting bar 20 is located adjacent the divider 19. A second divider 21 supports the remaining side of the sieve. Rods 18 are bent in a U-shaped configuration adjacent divider 19, which is designated 22. The lower part of configuration 22 passes through an aperture aligned in adjusting bar 20. This provides a pivotal arrangement between the adjusting bar 20 and rods 18. The sieve 15 is constantly vibrated, by means not shown, so as to maintain the falling grain from the upper sieve in motion at all times. The upper faces of lips 17 are curved as shown at 23 to provide an overlapping arrangement of staggered curves. By bringing lips 17 more near the vertical, more grain can pass through sieve 15. This amount is normally set manually, locking the relative position of adjusting bar 20 with respect to the frame 16. Such an arrangement results in grain passing over the rear of frame 16 while the combine is harvesting uphill. The grain is then returned to the threshing cylinder which causes grain loss and overloading.

According to the present invention, a plate 24 is fixed to the brace 12 and has pivoted to it a pendulum arm 25. The arm 25 has mounted at its lower end a heavy weight 26 which completes the pendulum.

An arcuate row of apertures 27 are provided on arm 25, one of which receives a pivotally mounted connector 28 which is split to engage the tip of the inner member 29 of a flexible Bowden cable 30. The sheath 31 of the cable 30 is clamped by a pivot 32 mounted on plate 24. The cable 30 extends around the rear of the combine and is terminated adjacent to the divider 19. The sheath 31 is clamped to frame 16 by means of a clamp 33. Member 29 has a solid tip 34 received by a pivot 35 mounted on a lever 36. Lever 36 is in turn pivoted to frame 16 by bolt 37. The remaining end of lever 36 is pivoted at 38 to a link 39 which is pivotally connected to adjusting bar 20 by means of bolt 39 and ear 40. An adjustment scale 41 is also fixed to frame 16 for convenience.

In order to limit movement of pendulum 25, a vertical stop 42 is fixed to plate 24 to prevent movement of the pendulum while the machine is traveling downhill.

The operation of the device is simple and automatic and can readily be seen in the drawings. When the machine is tilted upward, movement of weight 26, which remains vertical, is transferred by Bowden cable 30 to lips 17 to adjust the opening of the lips 17. By enlarging this opening, the grain more readily falls through sieve 15, eliminating unnecessary loss. The amount of adjustment required can be regulated by selectively positioning connector 28 in an aperture 27 closer to the pivot of arm 25 if less correction is desired, or farther from the pivot if more correction is required. The pivotal connections used throughout the device insure smooth operation without critical alignment.

Figure 5:
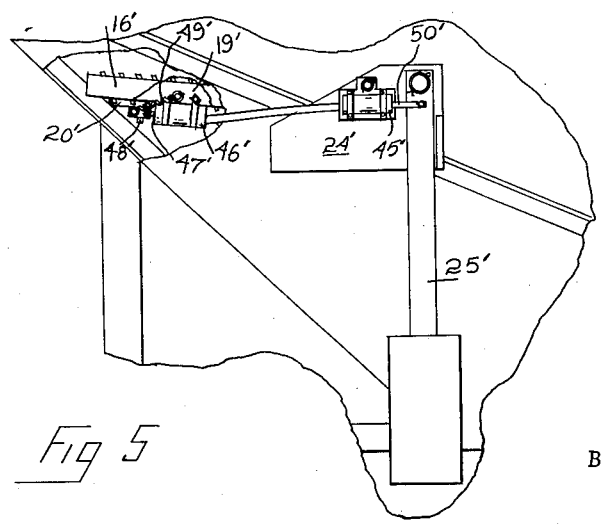
FIGURE 5 is a view similar to FIGURE 1 on a reduced scale showing a second form of the invention.

FIGURE 5 illustrates a second method of transferring the movement of a pendulum 25' to the adjusting bar 20'. A hydraulic cylinder 45 is pivotally mounted on plate 24' and has a piston rod 50 pivoted to the pendulum arm 25'. A hose connects cylinder 45' to a slave cylinder 46' which is fixed to frame 16'. The piston rod 47' of cylinder 46' is pivoted to an ear 48' depending from adjusting bar 20' to directly reciprocate bar 20' when moved by pressure from cylinder 45. A return spring 49' is a biasing spring connected between the extension ear 48' of adjusting bar 20' and the frame 16' moves the bar 20' against the cylinder 46' to return fluid to cylinder 45'. The resulting operation is believed to be obvious, since it is analogous to that previously described.

These are but two of many possible combinations which might accomplish this same result effectively. The basic features common to each combination are a pendulum mounted on the frame of the machine, and a flexible connection transmitting motion from the pendulum to the adjustment bar of a sieve so as to regulate the sieve openings responsive to the longitudinal angle of the machine with respect to the vertical. The sieve may be of any usual type, having vertical openings, or flat, adjustable openings wherein hole size is adjusted.

Various mechanical substitutions will be evident within the scope of this invention. Therefore, only the following claims are intended to limit the scope of the invention by their definitions.

Having thus described my invention, I claim:

1. In a separating apparatus, an automatic control device for varying the openings of a sieve comprising an adjusting means on the sieve adapted to vary the sieve openings, pendulum means pivotally mounted on the frame of the apparatus, and motion transmitting means operatively connected between said pendulum means and said adjusting means adapted to transmit movement of said pendulum means relative to the frame from said pendulum means to said adjusting means.

2. An automatic grain separator control for varying the sieve openings of a constantly moving sieve comprising a reference pendulum mounted on the frame of the separator, a flexible motion transmitting means operatively connected at one end to the pendulum arm, the remaining end of said flexible motion transmitting means being operatively connected to the adjusting means of said sieve, and stop means limiting movement of the pendulum in one direction, whereby said pendulum effectively controls the degree of sieve opening to compensate for grade variations.

3. In an apparatus having a sieve mounted in a moving frame and including adjusting means for varying the sieve openings, the improvement comprising a pendulum pivotally mounted on the main body of the apparatus, a flexible cable having one end of its sheath pivotally fixed to the main body of the apparatus and one end of its inner member pivotally fixed to said pendulum, the remaining end of the sheath being secured to the moving frame and the remaining end of the inner member being operatively connected to the adjusting means of the sieve whereby the sieve opening is varied by movement of said pendulum relative to the main body of the apparatus.

4. In an apparatus having a sieve mounted in a frame and including adjusting means for varying the sieve openings, the improvement comprising a pendulum pivotally mounted on the main body of the apparatus, first hydraulic means mounted on said main body and including a piston rod operatively connected to the pendulum, second hydraulic means mounted on said moving frame and including a piston rod operatively connected to said adjusting means, biasing means between the frame and the adjusting means, and a hydraulic connection linking said first and second hydraulic means whereby said first hydraulic means controls the position of said second hydraulic means.

References Cited in the file of this patent

UNITED STATES PATENTS

| 885,620 | Huff | Apr. 21, 1908 |
| 999,640 | Frick | Aug. 1, 1911 |
| 2,011,365 | Kuballe | Aug. 13, 1935 |
| 2,105,986 | Peterson | Jan. 18, 1938 |
| 2,278,081 | Kramer | Mar. 31, 1942 |
| 2,310,610 | Bissell | Feb. 9, 1943 |
| 2,413,382 | Sargent | Dec. 31, 1946 |
| 2,893,558 | Zollinger | July 7, 1959 |